(12) United States Patent
Kimura et al.

(10) Patent No.: US 10,690,473 B2
(45) Date of Patent: Jun. 23, 2020

(54) THUMB ROLLER CONSTANT-PRESSURE MECHANISM OF SLIDE CALIPER

(71) Applicant: MITUTOYO CORPORATION, Kawasaki-shi, Kanagawa (JP)

(72) Inventors: Kazuhiko Kimura, Kawasaki (JP); Kenji Ueda, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 242 days.

(21) Appl. No.: 16/009,739

(22) Filed: Jun. 15, 2018

(65) Prior Publication Data

US 2018/0372468 A1 Dec. 27, 2018

(30) Foreign Application Priority Data

Jun. 26, 2017 (JP) ................. 2017-123930

(51) Int. Cl.
*G01B 3/20* (2006.01)
*G01B 3/22* (2006.01)
*G01B 3/00* (2006.01)

(52) U.S. Cl.
CPC ............. *G01B 3/20* (2013.01); *G01B 3/008* (2013.01); *G01B 3/22* (2013.01)

(58) Field of Classification Search
CPC . G01B 3/20; G01B 3/205; G01B 5/14; G01B 5/00
USPC .......... 33/811, 784, 792, 794, 802, 815, 783
See application file for complete search history.

(56) References Cited

U.S. PATENT DOCUMENTS

| 3,273,248 | A | * | 9/1966 | Halverstadt | G01B 3/20 33/702 |
| 4,035,922 | A | * | 7/1977 | von Voros | G01B 3/18 33/784 |
| 4,419,824 | A | * | 12/1983 | Oberhans | G01B 3/18 33/784 |
| 4,420,887 | A | * | 12/1983 | Sakata | G01B 3/18 33/794 |
| 4,873,771 | A | * | 10/1989 | Wust | G01B 3/008 33/802 |
| 5,483,751 | A | | 1/1996 | Kodato | |
| 9,612,099 | B2 | * | 4/2017 | Emtman | G01B 3/205 |

(Continued)

FOREIGN PATENT DOCUMENTS

| JP | H06-185905 A | 7/1994 | |
| JP | 2015-165233 A | 9/2015 | |
| WO | WO-2016124991 A1 * | 8/2016 | ............ G01B 3/20 |

*Primary Examiner* — Christopher W Fulton
(74) *Attorney, Agent, or Firm* — Oliff PLC

(57) ABSTRACT

A slide caliper of this disclosure includes: a fine adjustment measurement part including: a finger-press type rotation part; and a supporter, wherein the finger-press type rotation part includes: a roller part including two disks; and a roller shaft part, wherein at least a portion of inner surfaces of the two disks and the main scale come into contact with each other by frictional force, wherein the roller bearing part includes: an inclined surface along which the roller shaft part is movable when the measuring force is applied; and a stopper disposed at a position where the stopper and the roller shaft part come into contact with each other, and when the measuring force is applied, the frictional force with respect to the roller part is reduced as the roller shaft part moves along the inclined surface while contacting with the stopper to limit the measuring force.

11 Claims, 8 Drawing Sheets

(56) References Cited

U.S. PATENT DOCUMENTS

| | | | |
|---|---|---|---|
| 2007/0068027 A1* | 3/2007 | Suzuki | G01B 3/18 |
| | | | 33/784 |
| 2008/0047158 A1* | 2/2008 | Saito | F16D 7/048 |
| | | | 33/811 |
| 2014/0150272 A1* | 6/2014 | Emtman | G01B 3/30 |
| | | | 33/558.04 |
| 2015/0247717 A1 | 9/2015 | Emtman et al. | |
| 2015/0276366 A1* | 10/2015 | Emtman | G01B 3/205 |
| | | | 33/701 |
| 2016/0061574 A1* | 3/2016 | Saito | G01B 3/205 |
| | | | 33/811 |
| 2019/0257635 A1* | 8/2019 | Kimura | G01B 5/0002 |

* cited by examiner

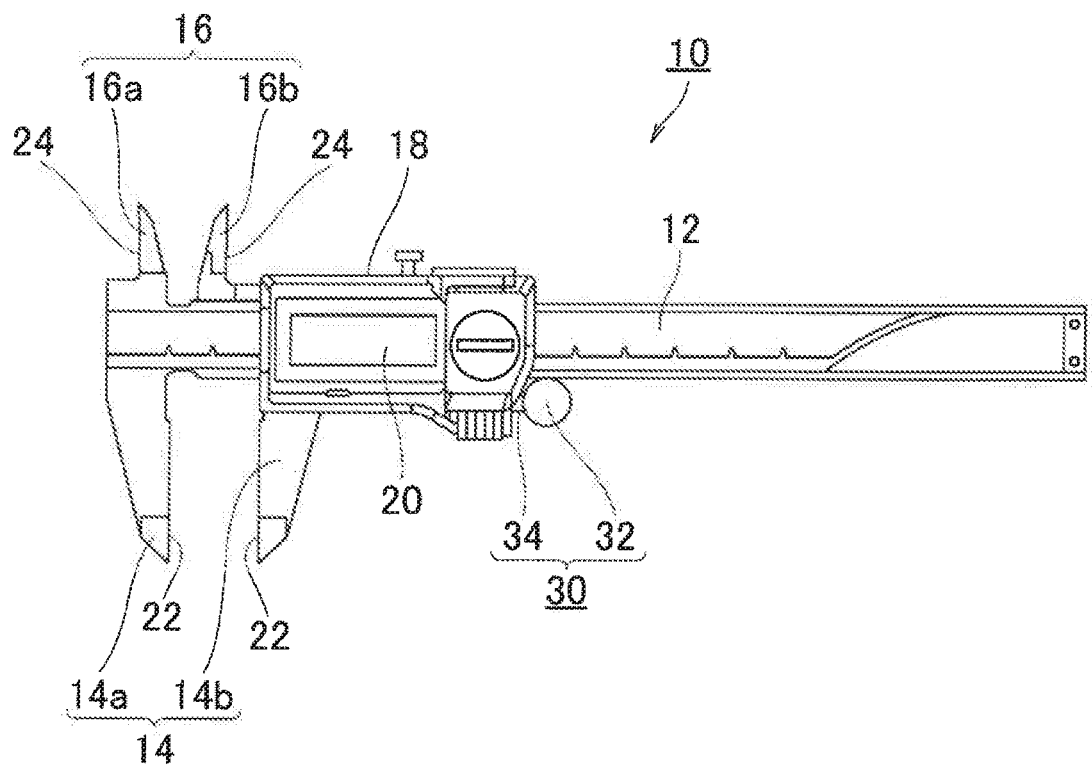
FIG.1
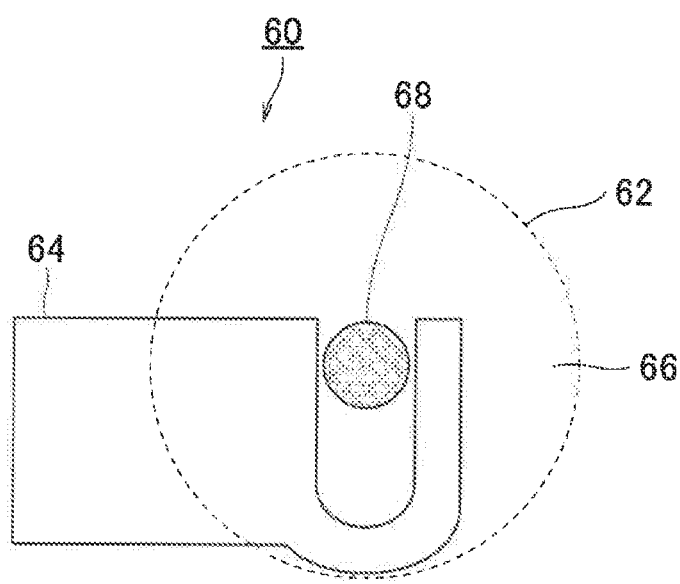
FIG.2 -BACKGROUND ART-

THUMB ROLLER CONSTANT-PRESSURE MECHANISM OF SLIDE CALIPER

CROSS-REFERENCE TO RELATED APPLICATION

This application claims priority from Japanese Patent Application No. 2017-123930 filed on Jun. 26, 2017 the entire subject matter of which is incorporated herein by reference.

TECHNICAL FIELD

This disclosure relates to a slide caliper provided with a thumb roller that is operable by a finger of a user, and specifically, this disclosure relates to a constant-pressure mechanism of measuring force that is applied by operation of a thumb roller.

BACKGROUND

A slide caliper such as a vernier caliper, a dial caliper, and a digital caliper, etc., has been known as a fine measurement device for accurately measuring target objects to be measured, such as industrial products and the like. Recently, a slide caliper including a thumb roller has come into wide use so as to improve measurement accuracy by finely and slightly moving a slider part provided with jaws of the slide caliper. In measurement by using the slide caliper including the thumb roller, measuring surfaces of the jaws are moved to closely approach the target object to a certain extent, and then a user operates the thumb roller by using a finger (thumb) to finely and slightly move the measuring surfaces of the jaws in a direction of the target object, thereby achieving more accurate measurement than a conventional slide caliper (a slide caliper that is not provided with a thumb roller). Meanwhile, since force (pressing force or measuring force) that presses the target object by using the thumb roller varies depending on each user, a variation with respect to a measured value occurs due to variation of the pressing force. Further, the excessive pressing force may be exerted on the target object, thereby causing damage of the target object.

Meanwhile, in consideration of the above, as disclosed in JP-A-H06-185905, proposed herein is a technology in which the excessive measuring force can be suppressed from being exerted on the target object by using a double structure including an outer roller and an inner roller (a constant-pressure means in which the outer roller idles against the inner roller) by which the measuring force is limited to be lower than predetermined measuring force. Further, as disclosed in JP-A-2015-165233, proposed herein is a technology in which a rotary-type actuation member to be operated by a user, a rotary-type bearing member, and a flexible connection member are provided. The rotary-type actuation member and the rotary-type bearing member are able to be elastically connected to each other (the flexible connection member flexibly connect the rotary-type actuation member and the rotary-type bearing member each other), such that it is advantageously possible not only to provide a thumb roller having flexibility properties, but also to reduce variation of the measuring force that is exerted on the slide caliper by the user in comparison with a thumb roller of the background art.

SUMMARY

Meanwhile, as disclosed in JP-A-H06-185905, the constant-pressure means (ratchet mechanism) may suppress the measuring force from becoming excessive. However, such structure of the slide caliper is complicated, assembly adjustment thereof is difficult, and thus cost significantly increases. Further, according to the roller device having the flexibility properties disclosed in JP-A-2015-165233, it is possible to prevent the variation of the measuring force. However, since measurement is performed by respective users having different senses and feelings, it may be difficult for the respective users to achieve the same measuring force at any time.

This disclosure provides a slide caliper including a thumb roller operable by a finger of a user by the simple structure, and provides a slide caliper including a constant-pressure mechanism and a thumb roller including the same, by which even though measuring force varies depending on each user, it is advantageously possible to generate the same measurement result with respect to a target object, thereby achieving highly accurate measurement result.

A slide caliper of this disclosure includes: a main scale; and a measurement slider part that is provided to be slidable in a longitudinal direction of the main scale to measure a target object in such a manner that two jaws come into contact with the target object, one of the two jaws being provided at the main scale and the other of the two jaws being provided in the measurement slider part, wherein the measurement slider part includes a fine adjustment measurement part, which is capable of finely moving the measurement slider part and which generates measuring force in the slide caliper when the target object comes into contact with a measuring surface of the other of the jaws, the fine adjustment measurement part includes: a finger-press type rotation part, which is operable by a finger of a user; and a supporter, which has a fixing part to fix the finger-press type rotation part to the measurement slider part and a roller bearing part into which the finger-press type rotation part is loosely fitted, the finger-press type rotation part includes: a roller part including two disks; and a roller shaft part, which is disposed approximately at a center of the roller part and connects the two disks to each other, wherein at least a portion of inner surfaces of the two disks and the main scale come into contact with each other by frictional force when the user performs operation by the finger, the roller bearing part includes: an inclined surface along which the roller shaft part is movable when the measuring force is applied in the slide caliper; and a stopper disposed at a position where the stopper and the roller shaft part come into contact with each other when the finger-press type rotation part is operated, and when the measuring force is applied on the slide caliper, the frictional force with respect to the roller part is reduced as the roller shaft part moves along the inclined surface while contacting with the stopper to limit the measuring force.

In the above described slide caliper, an angle between the inclined surface and the longitudinal direction of the main scale may be less than 90 degrees.

In the above described slide caliper, the roller bearing part may include: the inclined surface; and an opposite-side inclined surface that is provided to be opposite to the inclined surface in the longitudinal direction of the main scale, the opposite-side inclined surface may be provided such that an angle between the opposite-side inclined surface and a direction that is opposite to the longitudinal direction of the main scale is less than 90 degrees, and the roller bearing part may include two stoppers, one of which is a stopper performing a function with the inclined surface, and the other of which is an opposite-side stopper performing a function with the opposite-side inclined surface.

In the above described slide caliper, the inclined surface may be provided such that the angle between the inclined surface and the longitudinal direction of the main scale is in a range from 40 to 50 degrees.

In the above described slide caliper, the inclined surface may be provided such that the angle between the inclined surface and the longitudinal direction of the main scale is in a range from 40 to 50 degrees, and the opposite-side inclined surface may be provided such that the angle between the opposite-side inclined surface and the direction that is opposite to the longitudinal direction of the main scale is in a range from 40 to 50 degrees.

In the above described slide caliper, the stopper may be an elastic body.

In the above described slide caliper, the opposite-side stopper may be an elastic body.

In the above described slide caliper, the elastic body of the stopper may include any one of rubber, sponge, plastic.

In the above described slide caliper, the elastic body of the opposite-side stopper may include any one of rubber, sponge, plastic.

In the above described slide caliper, the elastic body of the stopper may be a coil spring and a bar spring.

[JP0017]

In the above described slide caliper, the elastic body of the opposite-side stopper may be a coil spring and a bar spring.

According to this disclosure, a slide caliper provided with a fine adjustment measurement part includes a finger-press type rotation part (a thumb roller), which includes two roller parts and a roller shaft part that is disposed at a center of the two roller parts and respectively connects the two roller parts; and a supporter including a roller bearing part, into which the roller shaft part is loosely fitted, and a fixing part that is fixed to a measurement slider part. The roller bearing part is provided with a stopper and an inclined surface. Accordingly, when measuring force is applied in a slide caliper, the roller shaft part of the finger-press type rotation part slides along the inclined surface or rolls along the inclined surface while pressing the stopper, such that the roller shaft part thereof is gradually separated from the main scale (or the roller shaft thereof slips along the main scale). Therefore, measuring force greater than a predetermined measuring force value may not be exerted on a target object (an object to be measured). That is, according to the aforementioned simple configuration, it is advantageously possible to accomplish the slide caliper including the thumb roller and the thumb roller that are capable of achieving highly accurate measurement with constant measuring force with little variation, even though any users perform measurement at any time.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a schematic view illustrating a slide caliper according to a first exemplary embodiment of this disclosure;

FIG. 2 is a schematic view illustrating a fine adjustment measurement part included in a slide caliper of the background art;

DETAILED DESCRIPTION

Figure 3A:
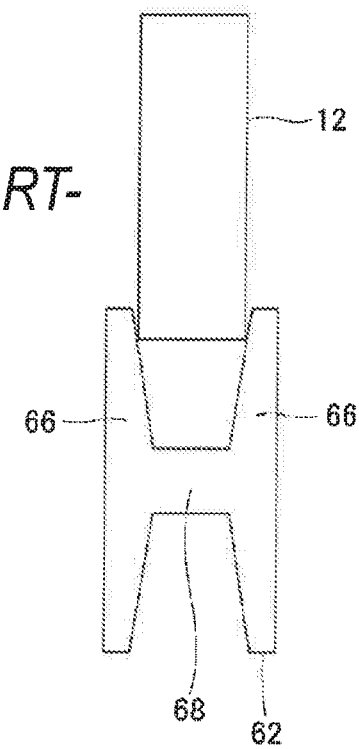
FIGS. 3A and 3B are schematic views illustrating a thumb roller included in the slide caliper of the background art when viewed from a vertical direction with respect to a disk front side (when viewed from a longitudinal direction)

Hereinafter, a slide caliper of this disclosure will now be described more fully with reference to the accompanying drawings, in which exemplary embodiments of this disclosure are shown. It is to be understood that this disclosure is not limited to the disclosed embodiments, but, on the contrary, is intended to cover various modifications and equivalent arrangements included within the spirit and scope of the appended claims. This disclosure can be applied to a vernier caliper, a dial caliper, and a digital caliper, etc.

First Exemplary Embodiment

FIG. 1 is a schematic view illustrating a slide caliper according to a first exemplary embodiment of this disclosure. As shown in FIG. 1, a slide caliper 10 is provided with: a main scale 12 in a rectangular plate shape; a measurement slider part 18 that is provided to be slidable in a longitudinal direction of the main scale 12; outer diameter-measuring jaws 14 by which an outer diameter size of a target object, that is, an object to be measured, is measured by placing the target object between the outer diameter-measuring jaws 14; and inner diameter-measuring jaws 16 by which an inner diameter size of the target object is measured.

The main scale 12 is provided with a fixed outer diameter-measuring jaw 14a which is one of the outer diameter-measuring jaws 14, and a fixed inner diameter-measuring jaw 16a which is one of the inner diameter-measuring jaws 16. Further, graduations (not shown) on the main scale 12 are marked on a front side of the main scale 12, and rails (not shown), by which the measurement slider part 18 is slidable when measuring the target object, are provided at opposite ends of the main scale 12 in a short-length direction. Additionally, in this specification, when the slide caliper 10 shown in FIG. 1 is viewed from the front side, a side at which the jaws are provided in the longitudinal direction, is referred to as a left side (left direction), and an opposite side thereof, that is, a side at which the jaws are not provided in the longitudinal direction when the slide caliper 10 is viewed from the front side, is referred to as a right side (right direction).

A movable outer diameter-measuring jaw 14b is provided in the measurement slider part 18 as the other of the outer diameter measuring jaws 14, and is disposed at an opposite side of the fixed outer diameter-measuring jaw 14a. Further, a movable inner diameter-measuring jaw 16b is provided in the measurement slider part 18 as the other of the inner diameter-measuring jaws 16, and is disposed at an opposite side of the fixed inner diameter jaw 16a. Further, the measurement slider part 18 is provided with a display part 20 provided on the front side, and a fine adjustment measurement part 30 by which the measurement slider part 18 is finely operated and moved. Additionally, the fine adjustment measurement part 30 includes a thumb roller 32 that is operable by a finger of a user, and a supporter 34 by which the thumb roller 32 is fixed to the measurement slider part 18. The thumb roller 32 is made of materials including a stainless steel, and the like. A display part 20 such as a liquid crystal display, and the like displays measurement information, and the like.

The slide caliper 10 is able to measure the outer diameter of the target object in such a manner that the measurement slider part 18 slides along the main scale 12 in the longitudinal direction, such that outer diameter-contacting surfaces 22 of the outer diameter-measuring jaws 14 (14a and 14b) come into contact with outer surfaces of the target object. Further, the slide caliper 10 is able to measure the inner diameter (a length between inner surfaces) of the target object in such a manner that inner diameter-contacting surfaces 24 of the inner diameter-measuring jaws 16 (16a and 16b) come into contact with inner surfaces of the target object. More specifically, in the case of respective measurement for the outer diameter of the target object and the inner diameter thereof, when the measurement slider part 18 is operated to closely approach the target object to a certain extent, and then the target object comes into contact with the measuring jaws (the outer diameter-measuring jaws 14 and the inner diameter-measuring jaws 16), the user rotates the thumb roller 32 by using his/her finger such that the measurement slider part 18 finely moves in the longitudinal direction of the main scale 12, based on which the measurement is performed. Accordingly, the slide caliper 10 including the fine adjustment measurement part 30 has an effect of performing fine measurement and achieving highly accurate measurement by using the thumb roller 32. Measured values obtained by the respective measurement are displayed on the display unit 20 as pieces of measurement information.

Here, when measuring surfaces of the measuring jaws (the outer diameter-contacting surfaces 22 or the inner diameter-contacting surfaces 24) come into contact with the target object, the fine measurement is performed by using the thumb roller 32. However, pressing force, by which contacting surfaces of the measuring jaws (the outer diameter-contacting surfaces 22 or the inner diameter-contacting surfaces 24) come into contact with the target object, varies depending on the users. In other words, the measured value varies depending on each user, thereby generating a variation due to different pressing force. According to the exemplary embodiment of this disclosure, a constant-pressure mechanism, in which the pressing force (measuring force) greater than predetermined pressing force is not applied, is provided in the fine adjustment measurement part 30 (thumb roller 32) included in the measurement slider part 18, such that it is advantageously possible to maintain constant pressing force even when other users perform the measurement with respect to any target objects. That is, the fine adjustment measurement part 30 in the exemplary embodiment of this disclosure performs a function as the constant-pressure mechanism of the measuring force applied in the slide caliper. Hereinafter, the fine adjustment measurement part 30 according to the exemplary embodiment will now be described in detail.

Configuration of Fine Adjustment Measurement Part

A configuration of a fine adjustment measurement part included in a slide caliper of the background art will now be described. FIG. 2 is a schematic view illustrating a fine adjustment measurement part included in a slide caliper of the background art. A fine adjustment measurement part 60 shown in FIG. 2 is provided with a thumb roller 62 that is operable by a finger of a user when measuring a target object, and a supporter 64 by which the thumb roller 62 is fixedly held to the measurement slider part 18. The supporter 64 is in a state of holding the fine adjustment measurement part 60, and more specifically, the supporter 64 is fitted into the measurement slider part 18 and fixed thereto by a screw and the like. The thumb roller 62 is provided with two roller parts 66 that are operated by the finger of the user, and a roller shaft part 68 that is disposed approximately at a center of the roller parts 66 and connects the two roller parts 66 each other.

Figure 3B:
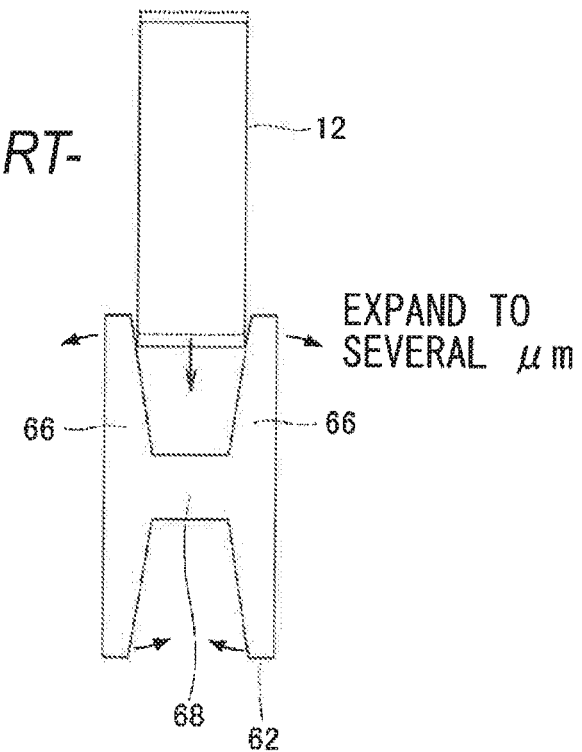

Here, FIGS. 3A and 3B are schematic views illustrating the thumb roller 62 included in the slide caliper of the background art when viewed from a vertical direction with respect to a disk front side (when viewed from a longitudinal direction in FIG. 1). As shown in FIGS. 3A and 3B, the roller parts 66 includes two disks, and the roller shaft part 68 is fixedly disposed approximately at the center of the respective two disks. Further, a distance between inner surfaces of the two roller parts 66 that are opposite to each other is configured to be gradually narrowed as the two roller parts 66 moves from an outer circumference portion to a central portion, such that the inner surfaces thereof and the main scale 12 come into contact with each other, thereby generating the measuring force.

As shown in FIG. 3B, when the thumb roller 62 is pressed against the main scale 12, a distance between the two roller parts 66 is expanded to about several μm to several tens μm depending on magnitude of the pressing force. Accordingly, as the pressing force, by which the thumb roller 62 is pressed against a side of the main scale 12, becomes stronger, frictional force becomes stronger. When the frictional force is sufficiently large, the thumb roller 62 rolls without slipping along the main scale 12. In a state where the measuring jaws come into contact with the target object, the roller shaft 68 presses the supporter 64, thereby generating the measuring force. Further, the measuring force to be applied may be adjustable according to a size of the supporter 64 and elastic modulus thereof.

Figure 4:
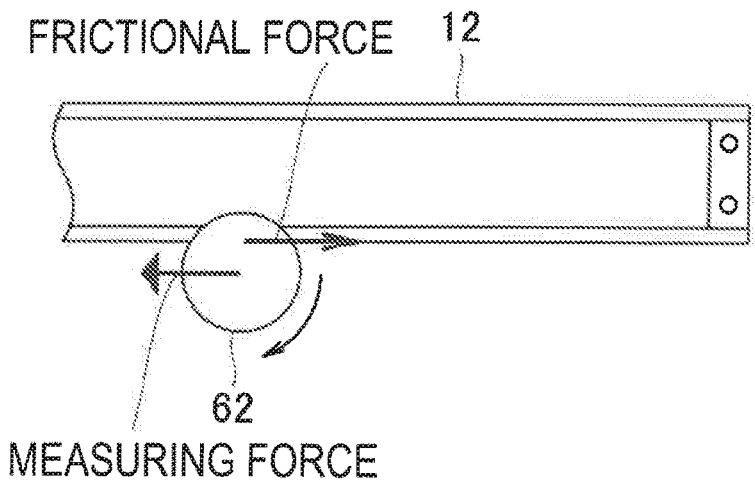
FIG. 4 is a schematic view illustrating a state in which a thumb roller operates with respect to a main scale.

That is, when measuring the target object by rotating the thumb roller 62 with his/her finger, the frictional force that is applied when an end part of the main scale 12 comes into contact with the inner surfaces of the two roller parts 66 prevents the inner surfaces thereof from slipping along the main scale 12, thereby generating the measuring force from the main scale 12. Accordingly, as shown in FIG. 4, the thumb roller 62 (measurement slider part 18) becomes movable in the longitudinal direction of the main scale 12. For example, in FIG. 2, the roller shaft part 68 presses the supporter 64 in a direction of the jaws in FIG. 1 by rotating the thumb roller 62 clockwise.

Figure 5:
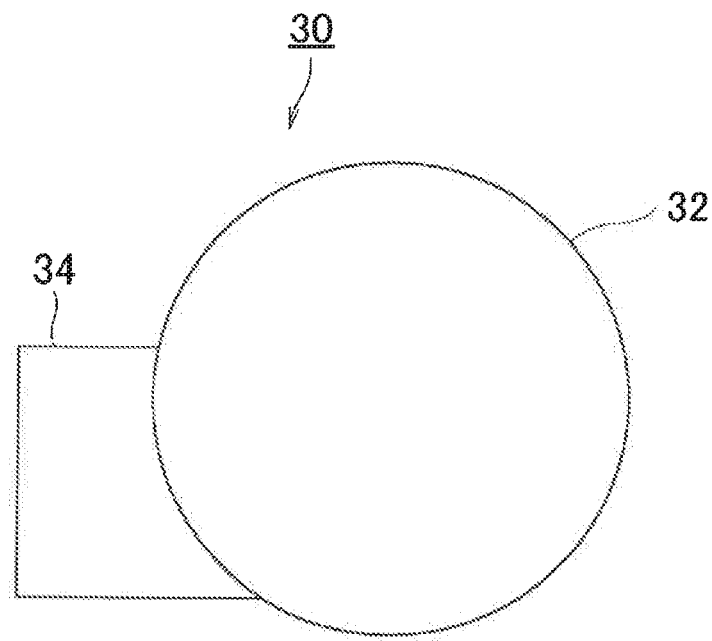
FIG. 5 is a schematic view illustrating a configuration of a fine adjustment measurement part included in the slide caliper according to the first exemplary embodiment of this disclosure.

Next, a configuration of the fine adjustment measurement part 30 will now be described. FIG. 5 is a schematic view illustrating a configuration of a fine adjustment measurement part included in the slide caliper according to the first exemplary embodiment of this disclosure. Specifically, the fine adjustment measurement part 30 shown in FIG. 5 has the same configuration as that of the fine adjustment measurement part 60 shown in FIG. 2. Further, the fine adjustment measurement part 30 is provided with the thumb roller 32 that is operable by his/her finger of the user when the user measures the target object, and the supporter 34 by which the fine adjustment measurement part 30 is fixedly held to the measurement slider part 18. The supporter 34 is in a state of holding the thumb roller 32, and more specifically, the supporter 34 is fitted into the measurement slider part 18 and fixed thereto by a screw and the like.

Figure 6:
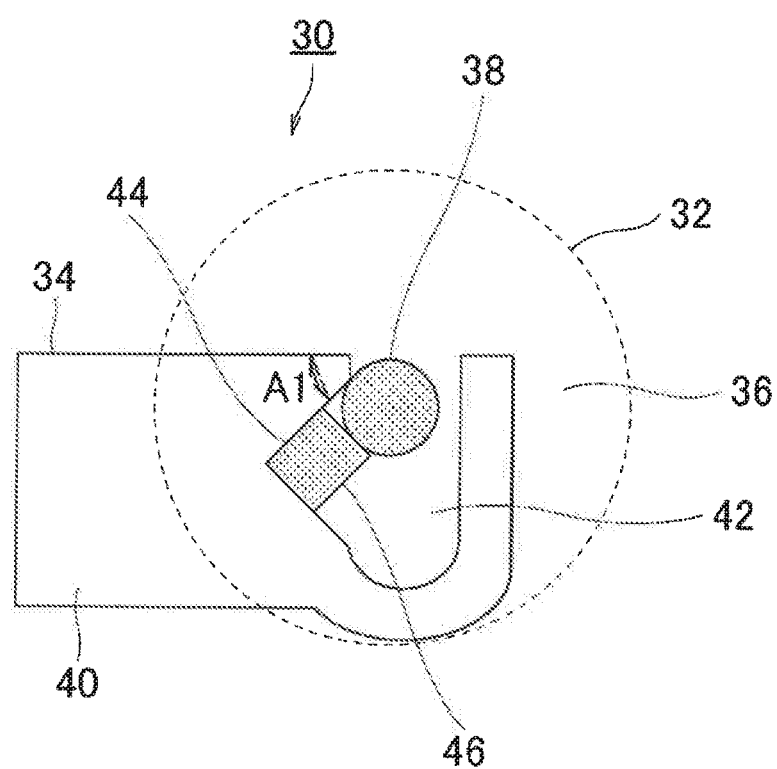
FIG. 6 is a detailed view illustrating the fine adjustment measurement part included in the slide caliper according to the first exemplary embodiment of this disclosure.

FIG. 6 is a detailed view illustrating the fine adjustment measurement part included in the slide caliper according to the first exemplary embodiment of this disclosure. The thumb roller 32 shown in FIG. 6 is provided with two disk-shaped roller parts 36 that is operable by his/her finger of the user and a roller shaft part 38 that is fixedly disposed approximately at a center of the roller parts 36. With respect to the fine adjustment measurement part 30 in the exemplary embodiment, configurations of the roller parts 36 and the roller shaft part 38 are the same as those of the fine adjustment measurement part 60 of the background art as well as a generation principle of the measuring force in FIGS. 3A and 3B.

As shown in FIG. 6, the supporter 34 is provided with a fixing part 40 by which the thumb roller 32 is fixed to the measurement slider part 18, and a roller bearing part 42 into which the roller shaft part 38 is loosely fitted. The roller bearing part 42 includes an inclined surface 44 that is inclined towards the longitudinal direction of the main scale 12 at a predetermined angle. Here, as shown in FIG. 2, a roller bearing part of the thumb roller of the background art is formed to have a U-shape. Meanwhile, the roller bearing part 42 according to the exemplary embodiment of this disclosure is formed to have a shape having the inclined surface 44 as shown in FIG. 6, based on which it is advantageously possible to achieve a constant-pressure mechanism which will be described later. As shown in FIG. 6, the inclined surface 44 is provided in such a manner that an angle A1 between the inclined surface 44 and a yaw direction of the main scale 12 is configured to be an angle less than 90 degrees, that is to say an acute angle (here, the supporter 34 and the main scale 12 are disposed in approximately parallel). Further, the inclined surface 44 is desirably provided with the angle A1 between the inclined surface 44 and the longitudinal direction of the main scale 12 in a range of 30 to 60 degrees, and it is more desirable that the angle A1 is provided in a range of 40 to 50 degrees. More specifically, the inclined surface 44 in the exemplary embodiment of this disclosure is provided with the angle A1 between the inclined surface 44 and the yaw direction of the main scale 12 at an angle of 45 degrees.

Further, the roller bearing part 42 is provided with a stopper 46, and the stopper 46 is disposed at a position where the stopper 46 and the roller shaft part 38 come into contact with each other while the thumb roller 32 is operated. The stopper 46 is desirably an elastic body. For example, the stopper 46 desirably includes any one of rubber, sponge, plastic (plastic having flexibility properties, etc.). Additionally, it is desirable that the stopper 46 has flexibility at least greater than that of the target object.

Operation of Thumb Roller

Figure 7:
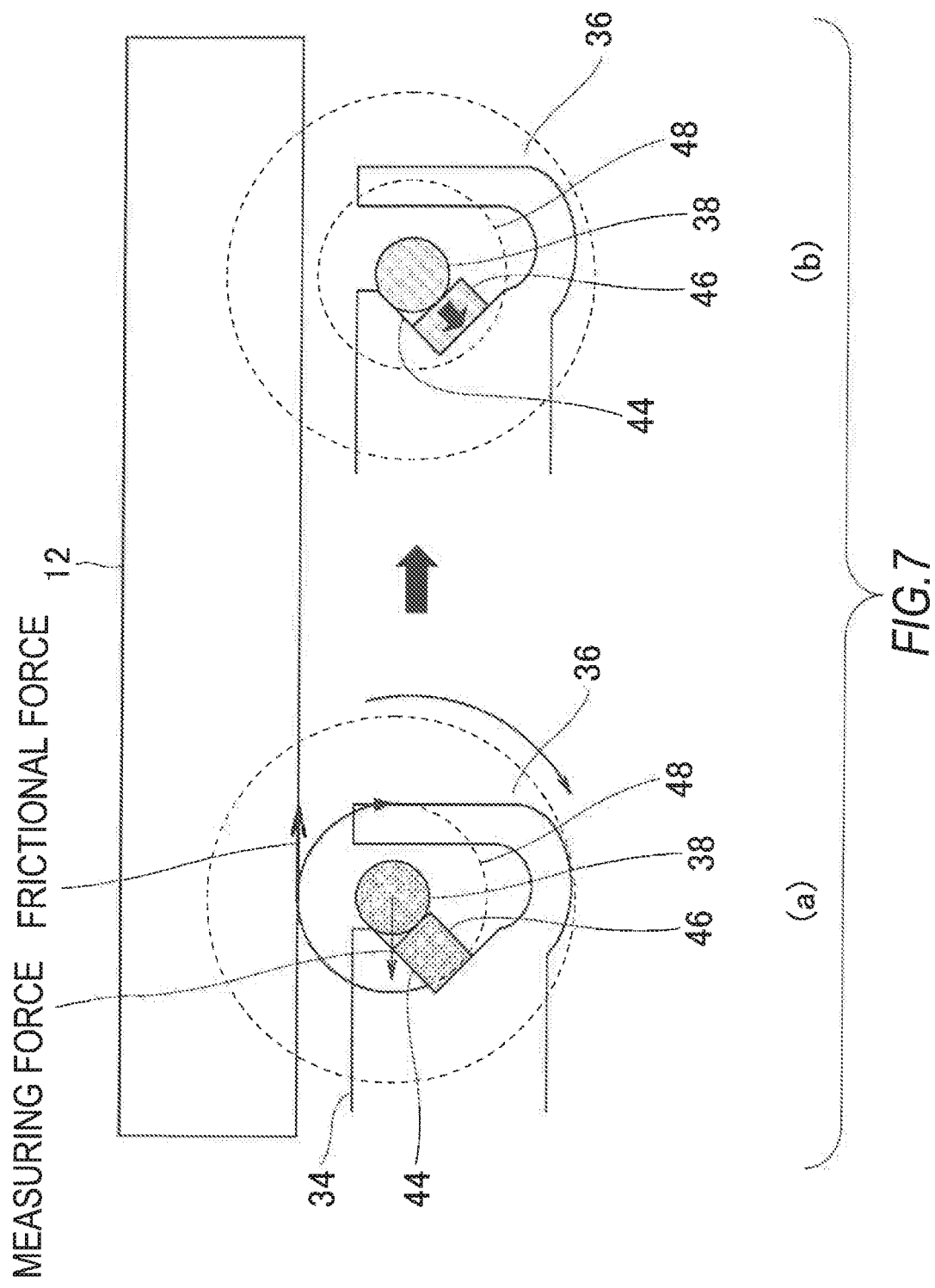
FIG. 7 is a view illustrating operation of a thumb roller included in the slide caliper according to the first exemplary embodiment of this disclosure.

Hereinafter, when measurement is performed by the thumb roller 32 of the exemplary embodiment, operation with respect to the thumb roller 32 will now be described. FIG. 7 is a view illustrating operation of the thumb roller included in the slide caliper according to the first exemplary embodiment of this disclosure. According to the operation description in parts (a) and (b) of FIG. 7, the target object is measured by the outer diameter-measuring jaws 14 (14a and 14b) in FIG. 1. As a first step, the user rotates the thumb roller 32 clockwise with his/her finger, such that the outer diameter-measuring jaw 14b (measurement slider part 18) is finely moved in a left direction with respect to the longitudinal direction of the main scale 12 and then closely approaches the target object (FIG. 1 and part (a) of FIG. 7). At this time, as shown in part (a) of FIG. 7, a main scale-contacting surface 48 of the roller parts 36 and the main scale 12 come into contact with each other, and when the measurement slider part 18 slides along the main scale 12, the roller shaft part 38 exerts force in a direction of the target object. When the target object comes into contact with the outer diameter-contacting surfaces 22 of the outer diameter-measuring jaws 14, the measuring force (force in an arrow direction of the jaws in part (a) of FIG. 7) is applied in the slide caliper 10. That is, the target object and the outer diameter-contacting surfaces 22 come into contact each other, thereby increasing the force in a direction of the roller shaft part 38 (force in the direction of the target object).

When the force of the roller shaft part 38 in the direction of the target object becomes greater than a predetermined force value, the roller shaft part 38 moves along the inclined surface 44 that is provided with the angle A1 therebetween at the angle of 45 degrees (acute angle) while compressing the stopper 46. As a result, the main scale-contacting surface 48 of the roller parts is gradually separated from the main scale 12 according to the aforementioned movement of the roller shaft part 38 (part (b) of FIG. 7). More specifically, since the thumb roller 32 is slightly and elastically deformed, frictional force occurring at contacting surfaces between the inner surfaces of the two roller parts 36 and the main scale 12 (force in an arrow direction that is opposite to the jaws in part (a) of FIG. 7) is gradually reduced. As a result, when the frictional force is reduced at a certain point, the roller parts 36 starts to slip along the main scale 12. More specifically, when the roller shaft 38 slides or rolls along the inclined surface 44, thereby moving towards the stopper 46 and pressing the stopper 46, the thumb roller 32 is gradually separated from the main scale 12, such that the force, by which the thumb roller 32 is pressed against the main scale 12, is gradually weakened, and thus consequently the frictional force is reduced. When the force reaches the certain point (when the force in the direction of the target object is greater than the predetermined force value), the thumb roller 32 and the main scale 12 start to slip along each other, thereby suppressing the measuring force greater than the predetermined force value from being applied. In other words, reaction force that is provided from the main scale 12 in such a manner that the roller parts 36 and the main scale 12 slip along each other, that is to say, the measuring force in the longitudinal direction of the main scale 12 is not applied greater than the predetermined force value.

When the measuring force is applied in the slide caliper 10, the roller shaft part 38 moves along the inclined surface 44 while compressing the stopper 46 by using the aforementioned measuring force, and then the main scale-contacting surface 48 is separated from the main scale 12 as shown in part (b) of FIG. 7 (the roller parts 36 and the main scale 12 slip along each other), such that it is advantageously possible to generate constant measuring force even when any users perform the measurement. Specifically, while the thumb roller 32 is being operated, the measurement slider part 18 comes into contact with the main scale 12, and the measurement slider part 18 slides along the main scale 12 while the thumb roller 32 is being rotated. However, when the measuring force is applied and reaches the predetermined measuring force value, the main scale-contacting surface 48 and the main scale 12 are gradually separated from each other (the roller parts 36 and the main scale 12 slip along each other). In other words, no matter how large pressing force is exerted on the target object by the user, since the main scale-contacting surface 48 of the roller parts 36 is in a state of being separated from the main scale 12, the thumb roller 32 only idles, such that the measurement slider part 18 does not slide along the main scale 12, thereby suppressing the target object from being damaged. Therefore, even though the pressing force that varies depending on each user is exerted on the roller parts 36, the measuring force exerted on the target object is constant, such that it is advantageously possible to achieve desirable measurement result with little variation.

Figure 8A:
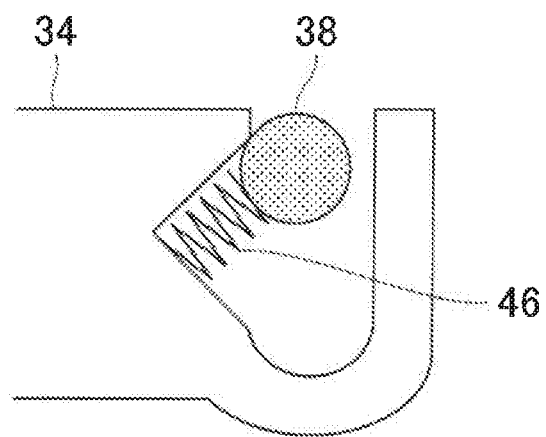
FIGS. 8A and 8B are views illustrating an example of an elastic body included in the fine adjustment measurement part of this disclosure.
Figure 8B:
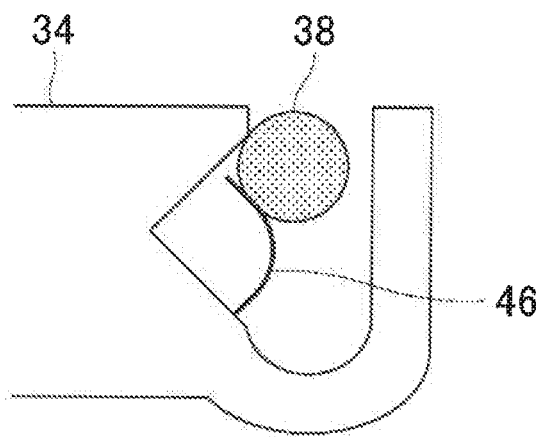

A coil spring shown in FIG. 8A and a bar spring shown in FIG. 8B may be used as the stopper 46 in the exemplary embodiment. For example, the bar spring may be integrally formed by using the same material as the supporter 34. Further, the stopper 46 in the exemplary embodiment is not limited to the springs shown in FIGS. 8A and 8B, and a plate spring or various kinds of springs may be used as well. In this case, since the spring corresponding to the required measuring force may be selected, highly accurate measurement result may be achieved.

Second Exemplary Embodiment

Next, a slide caliper according to a second exemplary embodiment of this disclosure will now be described with reference to the accompanying drawings. With respect to configurations that are in common with the slide caliper and the thumb roller shown in FIGS. 1 to 8A and 8B, a numeric 100 is respectively added thereto.

Figure 9:
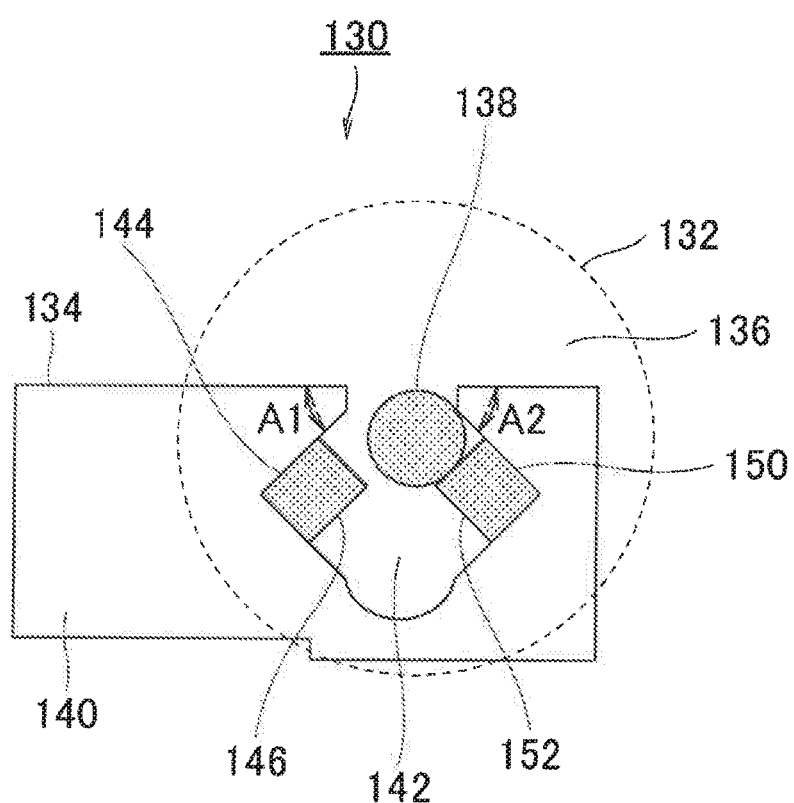
FIG. 9 is a schematic view illustrating a configuration of a fine adjustment measurement part included in a slide caliper according to a second exemplary embodiment of this disclosure.

FIG. 9 is a schematic view illustrating a configuration of a fine adjustment measurement part included in a slide caliper according to a second exemplary embodiment of this disclosure. As characteristics in the exemplary embodiment, a roller bearing part 142 that is provided in a supporter 134 of a fine adjustment measurement part 130 includes an inclined surface 144 and a stopper 146, and further includes an opposite-side inclined surface 150 and an opposite-side stopper 152 that are disposed at opposite sides of the inclined surface 144 and the stopper 146 in the longitudinal direction of the main scale 12. According to the aforementioned configuration, it is advantageously possible not only to perform measurement with respect to an outer diameter size of the target object, but also to generate the same constant measuring force as that of the first exemplary embodiment even when measuring an inner diameter size of the target object by using the inner diameter-measuring jaws 16 (16a and 16b).

The opposite-side inclined surface 150 is provided in such a manner that an angle A2 between the opposite-side inclined surface 150 and a direction that is opposite to the direction of the jaws provided in the main scale 12 (an opposite-side direction of the jaws) is configured to be an angle less than 90 degrees (here, supporter 134 and the main scale 12 are disposed in approximately parallel). Further, the opposite-side inclined surface 150 is desirably provided with the angle A2 between the opposite-side inclined surface 150 and the direction that is opposite to the jaws provided in the main scale 12 in a range of 30 to 60 degrees (meanwhile, an angle between the opposite-side inclined surface 150 and a direction of the jaws provided in the main scale 12 is in a range of 120 to 150 degrees), and it is more desirable that the angle A2 is provided in a range of 40 to 50 degrees (meanwhile, the angle between the opposite-side inclined surface 150 and the direction of the jaws provided in the main scale 12 is desirably in a range of 130 to 140 degrees). More specifically, the opposite-side inclined surface 150 in the exemplary embodiment of this disclosure is provided with the angle A2 therebetween at an angle of 45 degrees.

Further, it is desirable that the opposite-side stopper 152 has the same elastic body as that of the stopper 146. For example, the opposite-side stopper 152 desirably includes any one of rubber, sponge, plastic (plastic having flexibility properties, etc.). Additionally, it is desirable that the opposite-side stopper 152 has flexibility at least greater than that of the target object.

Figure 10:
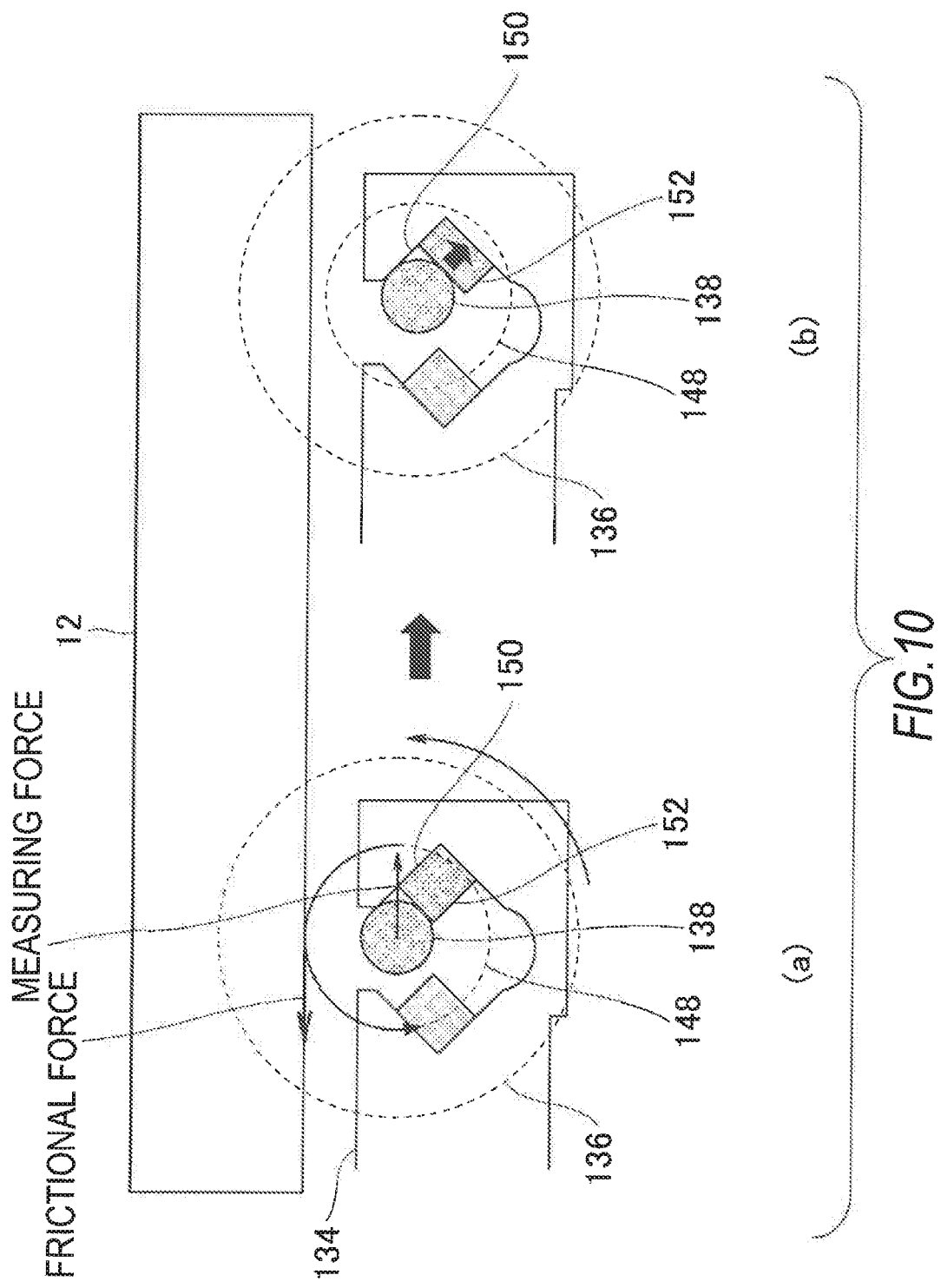
FIG. 10 is a view illustrating operation of a thumb roller included in the slide caliper according to the second exemplary embodiment of this disclosure.

FIG. 10 is a view illustrating operation of a thumb roller included in the slide caliper according to the second exemplary embodiment of this disclosure. Descriptions with respect to the operation of the thumb roller in parts (a) and (b) of FIG. 10 are provided with reference to the exemplary embodiment of FIG. 1 in which the target object is measured by the inner diameter-measuring jaws 16 (16a and 16b). As a first step, the user rotates roller parts 136 counter-clockwise with his/her finger, such that the inner diameter-measuring jaw 16b is finely moved towards a right side of the longitudinal direction of the main scale 12 (a right direction when viewed from the front side) and then closely approaches the target object (FIG. 1 and part (b) of FIG. 10). At this time, as shown in part (a) of FIG. 10, a main scale-contacting surface 148 of the roller parts 136 and the main scale 12 come into contact with each other, and when the measurement slider part 18 slides along the main scale 12, a roller shaft part 138 exerts force in the right direction (a direction that is opposite to the direction of the target object). When the target object comes into contact with the inner diameter-contacting surfaces 24 of the inner diameter-measuring jaws 16, the measuring force (force in an arrow direction that is opposite to the jaws in part (a) of FIG. 10) is applied in the slide caliper 10. In other words, the target object and the inner diameter-contacting surfaces 24 come into contact each other, thereby increasing the force in the direction of the roller shaft part 138 (the force in the direction that is opposite to the direction of the target object). When the force in the right direction of the roller shaft part 138 is greater than the predetermined force value, the roller shaft part 138 moves along the opposite-side inclined surface 150 while compressing the opposite-side stopper 152. More specifically, since the thumb roller 32 is slightly and elastically deformed, frictional force occurring at contacting surfaces between inner surfaces of the two roller parts 136 and the main scale 12 (force in an arrow direction of the jaws in part (a) of FIG. 10) is gradually reduced. As a result, when the frictional force is reduced at a certain point, the roller parts 136 starts to slip along the main scale 12, and thus the main scale-contacting surface 148 of the roller parts 136 is gradually separated from the main scale 12 (part (b) of FIG. 10).

As described above, the roller bearing part 142 includes the inclined surface 144 and the stopper 146, and further includes the opposite-side inclined surface 150 and the opposite-side stopper 152. Accordingly, when the target object is measured by the outer diameter-measuring jaws 14 (14a and 14b), or the target object is measured by the inner diameter-measuring jaws 16 (16a and 16b), it is possible to have the constant measuring force. As a result, even though the pressing force that varies depending on each user is exerted on the thumb roller 132, the measuring force exerted on the target object is not greater than the predetermined measuring force value, such that it is advantageously possible to achieve desirable measurement result with little variation.

The angle A1 of the inclined surface 144 and the angle A2 of the opposite-side inclined surface 150 in the exemplary embodiment may be set to different angles. The stopper 146 and the opposite-side stopper 152 in the exemplary embodiment may use an elastic body and an elastic material respectively having different elastic force. According to the aforementioned configuration, it is advantageously possible to respectively set desirable measuring force with respect to outer diameter measurement and desirable measuring force with respect to inner diameter measurement.

As described above, according to the slide caliper including the thumb roller in this disclosure, the fine adjustment measurement part 30 provided in the slide caliper 10 includes the thumb roller 32 having the two roller parts 36 and the roller shaft part 38; and the supporter 34 having the fixing part 40, by which the thumb roller 32 is fixed to the measurement slider part 18, and the roller bearing part 42 holding the roller shaft part 38. Further, the roller bearing part 42 is provided with the stopper 46 (elastic body, etc.) and the inclined surface 44 (the angle between the inclined surface 44 and the direction of the jaws provided in the main scale 12 is less than 90 degrees). Accordingly, when the measuring force is applied in the slide caliper, the roller shaft part 38 of the thumb roller 32 slides along the inclined surface 44 or rolls along the inclined surface 44 while compressing the stopper 46, such that the roller shaft part 38 thereof is gradually separated from the main scale 12 (or the roller shaft part 38 thereof slips along the main scale 12). Therefore, the measuring force is limited to the predetermined measuring force value or less, and even though the measuring force varies depending on each user, it is advantageously possible to achieve the same measurement result with respect to the target object.

What is claimed is:

1. A slide caliper comprising:
a main scale; and
a measurement slider part that is provided to be slidable in a longitudinal direction of the main scale to measure a target object in such a manner that two jaws come into contact with the target object, one of the two jaws being provided at the main scale and the other of the two jaws being provided in the measurement slider part, wherein
the measurement slider part includes a fine adjustment measurement part, which is capable of finely moving the measurement slider part and which generates measuring force in the slide caliper when the target object comes into contact with a measuring surface of the other of the jaws,
the fine adjustment measurement part includes: a finger-press type rotation part, which is operable by a finger of a user; and a supporter, which has a fixing part to fix the finger-press type rotation part to the measurement slider part and a roller bearing part into which the finger-press type rotation part is loosely fitted,
the finger-press type rotation part includes: a roller part including two disks; and a roller shaft part, which is disposed approximately at a center of the roller part and connects the two disks to each other, wherein at least a portion of inner surfaces of the two disks and the main scale come into contact with each other by frictional force when the user performs operation by the finger,
the roller bearing part includes: an inclined surface along which the roller shaft part is movable when the measuring force is applied in the slide caliper; and a stopper disposed at a position where the stopper and the roller shaft part come into contact with each other when the finger-press type rotation part is operated, and
when the measuring force is applied on the slide caliper, the frictional force with respect to the roller part is reduced as the roller shaft part moves along the inclined surface while contacting with the stopper to limit the measuring force.

2. The slide caliper according to claim 1, wherein an angle between the inclined surface and the longitudinal direction of the main scale is less than 90 degrees.

3. The slide caliper according to claim 1, wherein the roller bearing part includes: the inclined surface; and an opposite-side inclined surface that is provided to be opposite to the inclined surface in the longitudinal direction of the main scale,
the opposite-side inclined surface is provided such that an angle between the opposite-side inclined surface and a direction that is opposite to the longitudinal direction of the main scale is less than 90 degrees, and
the roller bearing part includes two stoppers, one of which is a stopper performing a function with the inclined surface, and the other of which is an opposite-side stopper performing a function with the opposite-side inclined surface.

4. The slide caliper according to claim 3, wherein the inclined surface is provided such that the angle between the inclined surface and the longitudinal direction of the main scale is in a range from 40 to 50 degrees, and
the opposite-side inclined surface is provided such that the angle between the opposite-side inclined surface and the direction that is opposite to the longitudinal direction of the main scale is in a range from 40 to 50 degrees.

5. The slide caliper according to claim 3, wherein the opposite-side stopper is an elastic body.

6. The slide caliper according to claim 5, wherein the elastic body of the opposite-side stopper includes any one of rubber, sponge, plastic.

7. The slide caliper according to claim 3, wherein the elastic body of the opposite-side stopper is a coil spring and a bar spring.

8. The slide caliper according to claim 1, wherein the inclined surface is provided such that the angle between the inclined surface and the longitudinal direction of the main scale is in a range from 40 to 50 degrees.

9. The slide caliper according to claim 1, wherein the stopper is an elastic body.

10. The slide caliper according to claim 9, wherein the elastic body of the stopper includes any one of rubber, sponge, plastic.

11. The slide caliper according to claim 1, wherein the elastic body of the stopper is a coil spring and a bar spring.

* * * * *